United States Patent [19]

Shiiki et al.

[11] 4,009,232
[45] Feb. 22, 1977

[54] METHOD FOR THE PRODUCTION OF CARBON MICROSPHERES 1-20 μ IN DIAMETER

[75] Inventors: Zenya Shiiki; Masaaki Nakao; Kunihiko Katori, all of Tokyo, Japan

[73] Assignees: Kureha Kagaku Kogyo Kabushiki Kaisha, Tokyo; Toyo Boseki Kabushiki Kaisha, Osaka, both of Japan

[22] Filed: Mar. 12, 1974

[21] Appl. No.: 450,397

[30] Foreign Application Priority Data

Mar. 13, 1973 Japan .............................. 48-28577

[52] U.S. Cl. .................................. 264/9; 264/29.7
[51] Int. Cl.² ........................................ B01J 2/06
[58] Field of Search ....................... 264/29, 117, 9; 423/445, 449; 252/421, 445

[56] References Cited

UNITED STATES PATENTS

| | | | |
|---|---|---|---|
| 2,652,386 | 9/1953 | Wallman | 264/14 |
| 3,017,668 | 1/1962 | Sundman | 264/13 |
| 3,305,474 | 2/1967 | Knowles et al. | 264/14 |
| 3,637,464 | 1/1972 | Walsh et al. | 264/117 |

Primary Examiner—Donald J. Arnold
Assistant Examiner—J. R. Hall
Attorney, Agent, or Firm—Lane, Aitken, Dunner & Ziems

[57] ABSTRACT

Discrete carbon microspheres having a particle diameter on the order of 1-20 μ are obtained by a process involving the steps of homogeneously mixing a pitch having a softening point of 70°-250° C, a nitrobenzene-insoluble content of not more than 25% and an H/C ratio of 0.2-1.0 with an aromatic solvent compatible with said pitch and dispersing the resultant mixture in an aqueous solution of a surface active agent with agitation and at a temperature to maintain the viscosity at 200-5000 cps to form microspheres of the pitch/solvent mixture. The dispersion is then cooled to solidify the microspheres. The microspheres 1-20 μ in diameter are then separated from the solution and from the finer particles and contacted an organic solvent which is incompatible with the pitch to extract the first-mentioned aromatic solvent from the microspheres. The resultant pitch microspheres are then contacted with an oxidizing agent to render them infusible and baked in an atmosphere of an inert gas to carbonize same.

13 Claims, No Drawings

METHOD FOR THE PRODUCTION OF CARBON MICROSPHERES 1-20 μ IN DIAMETER

FIELD OF THE INVENTION

This invention relates to a novel method for the production of discrete carbon microspheres having a particle diameter of the order of 1 to 20 μ.

BACKGROUND OF THE INVENTION

It is known that carbon microspheres having a particle diameter smaller than 1 μ can be produced by techniques utilized for the production of carbon black such as furnace black or channel black. It is, however, extremely difficult to obtain carbon microspheres having a particle diameter in the range of from 1 to 20 μ. Even if carbon microspheres of such a small size are obtained, they generally tend to exhibit a phenomenon wherein several adjacent carbon microspheres adhere to form a fused cluster. Therefore, it is not easy to obtain, with high selectivity, discrete carbon microspheres having a particle diameter of 1-20 μ. Methods for the production of carbon microspheres or hollow carbon microspheres resistant to mutual cohesion have been disclosed in the specification of U.S. Pat. No. 3,786,134, U.S. Ser. No. 215,416, filed Jan. 4, 1972 and U.S. Ser. No. 401,160, filed Sept. 27, 1975 and owned by the same assignee as that of the present invention. These methods all relate to the manufacture of carbon microspheres having particle diameters not smaller than 30 μ. Thus, these methods cannot be directly applied to the production of carbon microspheres having a particle diameter of the order of 1-20 μ.

SUMMARY OF THE INVENTION

U.S. Ser. No. 215,416, filed Jan. 4, 1972, for example, discloses that spheres of carbon are produced from a pitch having a softening point of 50°-350° C, a carbon content of 80-97%, a hydrogen/carbon atomic ratio of 0.2-2.5 and a nitrobenzene-insoluble content of 0-50%. This pitch is mixed with an organic solvent compatible with the pitch, and the resultant mixture is melted and dispersed at or above atmospheric pressure at a temperature of 50° to 350° C. The dispersion medium is water containing a suspending agent. The pitch/solvent mixture is thereby shaped into the form of spheres. These steps are followed by extracting from the spheres of pitch the used solvent and thereafter treating the spheres to render them infusible and then subjecting them to carbonization. As the suspending agent in this process, one or more water-soluble high molecular compounds selected from the group consisting of partially saponified polyvinylacetate, polyvinyl alcohol, methyl cellulose, carboxymethyl cellulose, polyacrylic acid and salts thereof, polyethylene glycol and ether derivatives and ester derivatives thereof, starch and gelatine are used.

The process of the present invention generally follows the process of U.S. Ser. No. 215,416, filed Jan. 4, 1972, except that a surface active agent is substituted for the suspending agent. This modified process permits efficient production of discrete carbon microspheres having a particle diameter on the order of 1-20 μ.

Accordingly, the present invention is characterized by the steps of homogeneously mixing a pitch havving a softening point of 70-250° C, a nitrobenzene-insoluble content of not more than 25% and an H/C ratio of 0.2-1.0 with an aromatic solvent compatible with the pitch and dispersing the resultant mixture by agitation at a temperature sufficient to maintain the viscosity of the dispersed particles at 200-5000 cps. The dispersion medium is an aqueous solution of a surface active agent. The resultant microspheres solidified by cooling and the solidified microspheres are then separated from the aqueous medium. The aromatic solvent is extracted from the microspheres by contact with an organic solvent compatible with the aforementioned aromatic solvent but lacking affinity for the aforementioned pitch. The pitch microspheres are then contacted with an oxidizing agent to render the pitch microspheres infusible and subsequently baked in an atmosphere of an inert gas to effect carbonization.

DETAILED DESCRIPTION OF THE INVENTION

The pitch used as the raw material in the present invention is required to have a softening point of 70-250° C, a nitrobenzene-insoluble content of not more than 25% and an H/C ratio of 0.2-1.0. It is not critical whether the pitch is of a petroleum origin or a coal origin. A pitch meeting these specifications can be obtained by subjecting a petroleum hydrocarbon such as, for example, crude oil, asphalt, heavy oil, light oil, kerosene or naphtha, to a heat treatment at 400°-2000° for a duration of about 0.001 to 2 seconds to produce a tarry substance and removing low molecular components from this tarry substance by an operation such as distillation or extraction. A pitch of this type can also be obtained by subjecting coal tar or a similar substance to a suitable heat treatment and thereafter removing low molecular components. The waste pitch which is produced as a by-product in oil refining can also be converted to this type of pitch by heating or oxidative treatments. Heretofore, such pitches have been utilized to only a small extent as fuel.

According to this invention, discrete carbon microspheres having a particle diameter in the range of 1-20 μ can be produced efficiently from a pitch of the type described above by treating the pitch in a process which comprises the following steps.

1. Mixing the pitch with an aromatic solvent:

The aromatic solvent selected for mixing with the pitch is required to be compatible with the pitch and have no affinity for water and should have a boiling point within the range of 70°-250° C. This aromatic solvent is generally selected from the group consisting of benzene, toluene, xylene, naphthalene, tetralin, methyl naphthalene, and the like. Although the ratio in which said aromatic solvent is mixed with the pitch will vary with the particular type of pitch and aromatic solvent to be used, the amount (weight) of said aromatic solvent used must be smaller than the amount of pitch. If the aromatic solvent accounts for 50% by weight or more of the mixture, the product carbon microspheres will have a specific gravity lower than is required. In mixing the pitch with the aromatic solvent, the temperature should be 100°-200° C so that the mixture will have a viscosity in the range of 200-5000 cps. The mixing is desirably effected by gentle agitation for 20 to 120 minutes in an atmosphere of an inert gas to avoid oxidation of the pitch.

2. Dispersing the resultant mixture in water in the presence of a surface active agent to form fine spheres of the pitch solvent mixture:

The surface active agents which can be used for the purpose of this step include anionic surface active agents such as fatty acid salts, olefin-sulfuric acid esters, long-chain alcohol-sulfuric acid esters, fatty-acid alkyl-sulfuric acid esters, alkylsulfonic acid salts, alkylbenzene-sulfonic acid salts and lower alkylnaphthalene-sulfonic acid salts; cationic surface active agents such as long-chain primary amine salts alkyltrimethyl ammonium salts and dialkyldimethyl ammonium salts; and nonionic surface active agents such as polyoxyethylenealkyl ethers, polyoxyethylene alkylphenyl ethers and polyoxyethylene alkylnaphthyl ethers. Of these various surface active agents, anionic surface active agents offer the advantages that they are stable at elevated temperatures, that they are available at low prices and that they are equally effective in lesser amounts. It is, therefore, desirable to use anionic surface active agents in this invention. It is particularly desirable to use alkylbenzene sulfonates such as sodium dodecylbenzene sulfonate. In contrast, use of protective colloids such as partially saponified polyvinyl acetate, polyvinyl alcohol, methyl cellulose and gelatine (used as suspending agents in the aforementioned invention of U.S. Ser. No. 215,416) leads to formation of dispersed particles having particle diameters of 40 $\mu$ or over. Thus, protective colloids are not suitable for the purpose of this invention.

In this second step, the surface active agent described above is added to water to prepare an aqueous solution containing the surface active agent generally in a concentration in the range of 0.01–2.0%. The pitch/solvent mixture obtained in step (1) above is dispersed in the aqueous solution at a temperature sufficient to retain its viscosity in the range of 200–5000 cps so that the mixture can be dispersed into finely-divided particles. Dispersion is effected by means of high-speed agitation. When a high-speed rotary turbine is employed for the purpose of agitation, for example, it should be operated at an extremely high revolution of 5000 rmp. or over. When the agitation is performed by means of an impeller in an agitator fitted with a baffle, the impeller should be operated at a rate of 200 m/min or over. Such agitation is generally continued for 5–120 minutes. When the viscosity of the mixture rises and exceeds the upper limit of 5000 cps while the mixture is being dispersed, the dispersed finely-divided particles will have a particle diameter as large as 50 $\mu$ or over. If the viscosity falls below the lower limit 200 cps of the range, there is a possibility that the pitch/solvent mixture will be divided into particles having diameters even smaller than 1 $\mu$. In dispersing therefore, due precautions should be taken to maintain the viscosity of the pitch/solvent mixture in the range of 200–5000 cps. The ratio of the pitch/solvent mixture to the aqueous solution is suitably in the range of from 50:50 to 10:90.

3. Solidifying the resultant dispersed particles by cooling:

The fine particles (spheres of pitch containing the aromatic solvent) formed in the preceding step are in a dispersed state within the aqueous solution containing the surface active agent and are readily solidified by cooling while agitated (generally to normal room temperature). In this manner mutual cohesion of particles is inhibited. Then, the aqueous solution in which the cooled and solidified particles are dispersed is allowed to stand at rest, so that the dispersed particles sediment to the bottom. To speed this sedimentation, it is desirable to add a water-soluble organic solvent such as, for example, an alcohol to the aqueous solution. The added organic solvent may serve both to inhibit the function of the surface active agent within the aqueous solution and consequently accelerate the rate of sedimentation and to extract the aromatic solvent from the surfaces of the finely-divided particles. As a result, the product particles possess an increased surface rigidity, which helps prevent mutual cohesion of the particles. If an electrolytic substance which serves as a demulsifying agent or coagulating agent is used in place of the water-soluble organic solvent in it functions to accelerate the sedimentation of the dispersed finely-divided particles but also causes mutual cohesion. Therefore, use of such electrolytic substances is not desirable. In causing the dispersed particles to sediment within the aqueous solution by means of quiescent standing, the speed at which the dispersed particles sediment increases with the increasing particle diameter of the particles. Therefore, it is desirable that the portion of the fine particles which do form a small extent, i.e. having a particle diameter smaller than 1 $\mu$, should be removed from the remainder of the particles by decanting the aqueous phase before these smaller particles have time to settle to the bottom. If the particles having diameters smaller than 1 $\mu$ are not removed, then they act as a binder and cause aggregation of the particles having diameters in the range of 1–20 $\mu$. The presence of such particles endangers the effective production of discrete carbon microspheres having the specified particle diameter. Solidified, spheres of pitch containing the aromatic solvent and having a particle diameter in the range of 1–20 $\mu$ are recovered by separating them from the aqueous solution after they have settled as described above.

4. Removing the residual aromatic solvent by extraction from the solidified spheres obtained in the preceding step:

The aromatic solvent which is still contained in the solidified microspheres is now removed by immersing the microspheres in an organic solvent which is compatible with the aromatic solvent but which lacks affinity for the pitch. Examples of such organic solvents which are suitable for this extraction include alcohols such as methanol, ethanol and propanol and paraffinic hydrocarbons such as hexane, heptane and light naphtha. This extraction may be effected by placing the solidified microspheres in the extracting reagent, agitating the reagent for a period of time, generally 1–24 hours, and thereafter separating from the extracting reagent by sedimentation or filtration techniques. In this way, spheres of pitch having a particle diameter in the range of 1–20 $\mu$ and free of the aromatic solvent are obtained.

5. Rendering the pitch microspheres infusible by wet treatment:

The pitch microspheres which have been freed of the aromatic solvent in the preceding step are rendered infusible by treatment with an oxidative aqueous solution. In order to avoid agglomeration to the fullest possible extent in this step, it is preferred to disperse the pitch microspheres in advance in water containing 0.001–0.01% of the aforementioned surface active agent and then add an oxidizing agent to the aqueous dispersion. The oxidizing agent for this treatment is suitably a known oxidizing agent such as, for example, nitric acid, sulfuric acid, chromic acid (potassium dichromate plus sulfuric acid), permanganate or hypochlorous acid. As occasion demands, this treatment may be accompanied by application of heat and/or irradiation.

6. Carbonizing the infusible pitch microspheres:

The pitch microspheres which have been rendered infusible by the treatment of the preceding step are carbonized by baking at temperature above 800° C in an atmosphere of an inert gas such as nitrogen or argon. In this step, the heating at temperatures up to 2000° C converts the spheres of pitch into carbon spheres. At temperatures about 3000° C, the heating produces graphite spheres.

Thus, according to the present invention, discrete carbon microspheres can be obtained from a pitch previously regarded as a waste material. The carbon microspheres which are obtained by the present method find utility in an extensive range of uses, for example, as an ingredient for powder metallurgy in the manufacture brake materials and sliding materials, in infrared absorbing materials, in the manufacture of isotropic graphite for use in atomic piles, and upon conversion to an activated carbon, in medical applications, and the like.

The present invention will be described more specifically with reference to the preferred embodiments to be described below.

EXAMPLE 1

An agitator having a volume of 20 liters and provided with a 10–100 rpm low-speed agitation impeller and a 5000–9000 rmp high-speed rotary turbine (homomixer), was charged with 2 kg of petroleum pitch obtained by thermal cracking of SERIA crude oil. The pitch had a softening point of 160° C, a nitrobenzene insoluble content of 19% and an H/C ratio of 0.58 $\mu$. 1.33 kg of naphthalene were added and the contents were agitated in an atmosphere of nitrogen at 130° C at a rate of 60 rpm for 60 minutes to produce a pitch-naphthalene mixture (having a viscosity of 500 cps). The resultant mixture was added to 10 liters of water containing 0.2% of sodium dodecylbenzene sulfonate and agitated at 98° C at a rate of 9000 rpm for 60 minutes to obtain a dispersion. Then, the dispersed system was cooled to normal room temperature to solidify the naphthalene-containing pitch particles and was allowed to stand at rest over night. The resultant water phase containing unsedimented particles of a smaller than desired particle diameter was decanted from the agitator, thus removing both water and the unsedimented particles less than 1 $\mu$ in diameter. The naphthalene-containing pitch spheres consequently obtained were agitated in methanol for about ten hours to reduce the residual naphthalene content in the pitch spheres to less than 0.5%. After extraction of the naphthalene, the pitch microspheres were placed in an aqueous 0.01% sodium dodecylbenzene sulfonate solution and agitated by a high-speed turbine for 10 minutes to disperse the pitch spheres. While the dispersed system was being agitated, nitric acid was added until the nitric acid concentration therein reached 30%. Then, the dispersed pitch spheres were left at 50° C for 3 hours in the nitric acid solution to render them infusible. After this treatment with nitric acid, the pitch spheres were heated in an oven at 300° C for 5 hours to make them thoroughly infusible. Subsequently, they were carbonized by baking in an atmosphere of nitrogen at 850° C for 3 hours. The carbon microspheres thus obtained were nearly completely discrete globules. They had a peak particle size distribution near 5 $\mu$ and 92% of the microspheres had particle diameters falling within the range of 1–20 $\mu$.

EXAMPLE 2

In an autoclave having an inside diameter of 100 mm, of volume of 1.5 liters and provided with a baffle and an anchor-shaped impeller, 200 g of the same pitch as used in Example 1 and 120 g of naphthalene were agitated at a rate of 125 rpm in an atmosphere of nitrogen at 125° C for 30 minutes to produce a homogeneous pitch-naphthalene mixture (having a viscosity of 400 cps). This mixture was mixed with 0.9 liter of an aqueous 0.3% sodium dodecylbenzene sulfonate solution and agitated at a rate of 1000 rpm at 105° C for 30 minutes to form a dispersion.

The dispersed system was then cooled to normal room temperature to produce dispersed spheres of pitch. By following the procedure of Example 1, carbon microspheres were obtained from the dispersed system. These carbon microspheres were nearly completely independent globules. They had a peak particle size distribution near 7 $\mu$ and at least 86% of the microspheres had particle diameters in the range of 1–20 $\mu$.

EXAMPLE 3

A homogeneous pitch-naphthalene mixture was prepared by following the procedure of Example 2. The mixture was mixed with 0.9 liter of an aqueous 0.5% sodium laurylsulfate solution and agitated with an anchor-shaped impeller of 1200 rpm at 105° C for 30 minutes to form a dispersion.

By following the procedure of Example 1, carbon microspheres were obtained from the dispersed system. The carbon microspheres thus obtained were nearly completely independent globules. They had a peak of particle size distribution near 10 $\mu$ and at least 90% of the microspheres had particle diameters falling within the range of 1–20 $\mu$.

EXAMPLE 4

In the autoclave of Example 2, 180 g of the same pitch as used in Example 1 and 120 g of naphthalene were agitated at a rate of 125 rpm in an atmosphere of nitrogen at 120° C for 30 minutes to prepare a homogeneous pitch-naphthalene mixture (having a viscosity of 350 cps). The mixture was mixed with 0.9 liter of an aqueous 0.55 polyoxyethylene nonylphenyl ether ("Emalgen 930", made by Kao-Atlas Co.) solution and agitated with an anchor-shaped impeller at a rate of 1200 rpm at 95° C for 30 minutes to form a dispersion. By following the procedure of Example 1, carbon microspheres were obtained from the resultant dispersed system. The carbon microspheres thus obtained were nearly completely independent globules. They had a peak of particle size distribution near 10 $\mu$ and at least 73% of the microspheres had particle diameters falling within the range of 1–20 $\mu$.

COMPARATIVE EXAMPLE 1

The procedure of Example 1 was repeated, except water containing 1% of partially saponified polyvinyl acetate (GH-17, made by Nippon Gosei Co.) was used in place of the sodium dodecylbenzene sulfonate solution. Examination of the carbon microspheres thus formed revealed that only 6% of the carbon microspheres had particle diameters falling within the range of 1–20 $\mu$.

COMPARATIVE EXAMPLE 2

The procedure of Example 1 was repeated except that water containing 1% of methyl cellulose was used as the dispersion medium. Examination of the resultant carbon microspheres revealed that only 3% of the microspheres had particle diameters falling within the range of 1–20 μ.

COMPARATIVE EXAMPLE 3

The procedure of Example 1 was repeated except that water containing 1% of PVA was used to disperse the pitch, i.e. as the dispersion medium. Examination of the resultant carbon microspheres revealed that only 2% of the carbon microspheres had particle diameters falling within the range of 1–20 μ.

COMPARATIVE EXAMPLE 4

A pitch (having a softening point of 140° C, a nitrobenzene-insoluble content of 4% and a H/C ratio of 0.6) obtained by heat treatment of ethylene-bottoms oil was dispersed by following the procedure of Example 1. In this case, however, the resultant pitch-naphthalene mixture has a viscosity of less than 200 cps. When the system containing the dispersed pitch was left to stand at rest to allow the pitch particles to sediment to the bottom, most of the particles failed to sediment and remained suspended in the water phase. Thus, nearly about half the particles were removed with the water phase when decanted. The remaining finely-divided pitch particles were recovered and subjected to the same procedure as that of Example 1 to obtain carbon microspheres. The carbon microspheres thus obtained cohered to one another and very few of them were independent free spheres.

What is claimed is:

1. A method for the production of discrete carbon microspheres having a particle size of 1–20 μ comprising:
   a. mixing a pitch having a softening point of 70°–250° C, a nitrobenzene-insoluble content of not more than 25% and a H/C ratio of 0.2–1.0 with a water-insoluble aromatic solvent having a boiling point of 70°–250° C to produce a homogeneous pitch/solvent mixture of more than 50% by weight pitch, said mixing being conducted at a temperature of 100°–200° C to maintain a viscosity of 200–5000 cps;
   b. dispersing said pitch/solvent mixture with agitation in an aqueous solution of a surface active agent to form an aqueous dispersion of said pitch/solvent mixture in the form of microspheres, said solution being at a temperature sufficient to retain said viscosity of said pitch/solvent mixture at 200–5000 cps;
   c. cooling said aqueous dispersion to solidify said microspheres;
   d. separating said solidified pitch/solvent microspheres having a particle size of 1–20 μ from said aqueous solution and from particles having diameters smaller than 1 μ;
   e. extracting said aromatic solvent from said microspheres by contacting said microspheres with an organic solvent compatible with said aromatic solvent, but incompatible with said pitch;
   f. contacting said microspheres with an oxidizing agent to render said microspheres infusible; and
   g. heating said microspheres in an inert gas atmosphere to produce carbon microspheres having a particle size of 1–20 μ.

2. The method of claim 1, wherein said aromatic solvent is selected from the group consisting of benzene, toluene xylene, naphthalene, tetralin and methylnaphthalene.

3. The method of claim 1, wherein said surface active agent is selected from the group consisting of anionic surface active agents, cationic surface active agents and nonionic surface active agents.

4. The method of claim 3, wherein said anionic surface active agent is selected from the group consisting of fatty acid salts, olefin-sulfuric acid esters, long-chain alcohol-sulfuric acid esters, fatty-acid alkyl-sulfuric acid esters, alkyl sulfonic acid salts, alkylbenzene-sulfonic acid salts and lower alkylnaphthalene-sulfonic acid salts.

5. The method of claim 3, wherein said cationic surface active agent is selected from the group consisting of long-chain primary amine salts, alkyltrimethyl ammonium salts and dialkyldimethyl ammonium salts.

6. The method of claim 3, wherein said nonionic surface active agent is selected from the group consisting of polyoxyethylenealkyl ethers, polyoxyethylene alkylphenyl esters and polyoxylethylene-alkylnaphthyl ethers.

7. The method of claim 1, wherein said organic solvent is selected from the group consisting of alcohols and paraffinic hydrocarbons.

8. The method of claim 7, wherein said alcohol is selected from the group consisting of methanol, ethanol and propanol.

9. The method of claim 7, wherein said paraffinic hydrocarbon is selected from the group consisting of hexane, heptane and light naphtha.

10. The method of claim 1, wherein said oxidizing agent is selected from the group consisting of nitric acid, sulfuric acid, chromic acid, permanganates and hyprochlorous acid.

11. The method of claim 1, wherein said cooling is carried out in the presence of a water-soluble organic solvent added to the aqueous dispersion in step c to facilitate separating the solidified microspheres.

12. The method of claim 11, wherein said water-soluble organic solvent is an alcohol.

13. The method of claim 1, wherein said pitch microspheres are rendered infusible by dispersing said microspheres in water containing 0.001–0.1% of a surface active agent and subsequently adding said oxdizing agent to the aqueous dispersion.

* * * * *